(12) United States Patent
Choi

(10) Patent No.: US 9,691,028 B2
(45) Date of Patent: Jun. 27, 2017

(54) COLLABORATIVE PLATFORM FOR DATA DYNAMICS INTERPRETATION

(71) Applicant: Jin Hyuk Choi, Daejeon (KR)

(72) Inventor: Jin Hyuk Choi, Daejeon (KR)

(73) Assignee: INFORIENCE INC., Daejeon (KR)

(*) Notice: Subject to any disclaimer, the term of this patent is extended or adjusted under 35 U.S.C. 154(b) by 231 days.

(21) Appl. No.: 14/284,566

(22) Filed: May 22, 2014

(65) Prior Publication Data
US 2015/0302091 A1    Oct. 22, 2015

(30) Foreign Application Priority Data
Apr. 16, 2014  (KR) .................. 10-2014-0045338

(51) Int. Cl.
*G06F 17/30* (2006.01)
*G06N 5/02* (2006.01)
*G06N 5/04* (2006.01)

(52) U.S. Cl.
CPC ........ *G06N 5/025* (2013.01); *G06F 17/30551* (2013.01); *G06N 5/04* (2013.01)

(58) Field of Classification Search
CPC ........ G06F 17/30554; G06F 17/30864; G06F 17/30551; G06F 17/30598; G06F 17/30353; G06F 17/30386; G06F 17/30572; G06F 17/30973; G06F 17/30991; G06F 21/316; G06F 2216/03; G06F 11/008; G06F 11/3089; G06F 11/3419; G06F 11/00; G06F 17/30044; G06F 17/30696; H04L 51/32; G06Q 50/01; G06N 5/025; G06N 5/04
USPC .................................... 707/722, 706
See application file for complete search history.

(56) References Cited

U.S. PATENT DOCUMENTS

| | | | | |
|---|---|---|---|---|
| 2005/0262063 | A1* | 11/2005 | Conboy | G06F 17/30864 |
| 2007/0022111 | A1* | 1/2007 | Salam | G06F 17/30864 |
| 2013/0060783 | A1* | 3/2013 | Baum | G06F 17/30551 |
| | | | | 707/746 |
| 2013/0268520 | A1* | 10/2013 | Fisher | G06F 17/30477 |
| | | | | 707/723 |
| 2014/0046923 | A1* | 2/2014 | Ruble | G06T 15/10 |
| | | | | 707/706 |
| 2014/0207792 | A1* | 7/2014 | Carasso | G06F 17/271 |
| | | | | 707/748 |
| 2015/0212663 | A1* | 7/2015 | Papale | G06F 17/30424 |
| | | | | 715/762 |

* cited by examiner

*Primary Examiner* — Evan Aspinwall
(74) *Attorney, Agent, or Firm* — Patent Office of Dr. Chung Park

(57) ABSTRACT

Disclosed is a data processing apparatus which is connectable to a network. The data processing apparatus includes: a rule editor which edits, based on input editing information, a search rule for setting a search condition for searching for data generated according to time; a data searcher which searches for the data in accordance with the edited search rule; a visualizer which visualizes the search result; and an analysis sharing part which transmits additional analysis on an analysis of the search result to terminals of a first user and a second user through the network.

11 Claims, 6 Drawing Sheets

Fig. 2

| Time | Data #1 | Data #2 | Data #3 | Data #4 | Data #5 |
|---|---|---|---|---|---|
| 2014-02-21-03-14-16 | **** | **** | **** | **** | **** |
| 2014-02-21-03-20-15 | **** | **** | **** | **** | **** |
| 2014-02-21-03-21-03 | **** | **** | **** | **** | **** |
| 2014-02-21-03-22-18 | **** | **** | **** | **** | **** |
| 2014-02-21-03-23-45 | **** | **** | **** | **** | **** |
| 2014-02-21-03-25-16 | **** | **** | **** | **** | **** |

Fig. 3

| ( | T_a | < | 33 | ) | & |
|---|---|---|---|---|---|
|   |   |   |   |   |   |
|   |   |   |   |   |   | rule editing window

Drag & drop operator

| < | > | = | ( | ) | [ | ] | & | \| |
|---|---|---|---|---|---|---|---|---|
| { | } | min | max | + | - | s | m | del |

| 1 | 2 | 3 |
|---|---|---|
| 4 | 5 | 6 |
| 7 | 8 | 9 |
|   | 0 | del | variable name: T_a  T_b  T_c

FIND

COLLABORATIVE PLATFORM FOR DATA DYNAMICS INTERPRETATION

CROSS-REFERENCE TO PRIOR APPLICATIONS

This application claims priority under 35 U.S.C. §119 from Korean Application No. 10-2014-0045338 filed on Apr. 16, 2014, the subject matter of which is incorporated herein by reference.

BACKGROUND

Field

The present invention relates to a collaborative platform for data dynamics interpretation, and more particularly to a data processing apparatus, a data processing program and a recording medium.

Description of Related Art

Data including a business history, a user's service use history, a web visit history, mobile sensor data, environment sensor data, manufacturing process data, etc., has a large scale and a dynamic pattern which changes according to time.

A cause of data change may be also greatly changed according to conditions and environments. Since the dynamic pattern includes a lot of useful information and is a very important factor in making decisions based on data, it is important to identify and analyze the dynamic pattern.

Knowledge and value that should be extracted from the dynamic patterns may be variously changed according to the kind and content of the collected data, collection environments, and furthermore user's purpose of data use, and the like.

Therefore, in order to obtain appropriate knowledge and value from data, it is not enough to simply and collectively apply a typical data analysis process. There is a requirement to sufficiently utilize background knowledge and experience about the data contents, data generation environments and conditions, etc.

SUMMARY

One embodiment is a data processing apparatus which is connectable to a network. The data processing apparatus includes: a rule editor which edits, based on input editing information, a search rule for setting a search condition for searching for data generated according to time; a data searcher which searches for the data in accordance with the edited search rule; a visualizer which visualizes the search result; and an analysis sharing part which transmits additional analysis on an analysis of the search result to terminals of a first user and a second user through the network.

The data processing apparatus may include a rule library comprised of a predetermined search rule.

The rule editor may include a code editor which codes a new search rule and a compiler which compiles the coded search rule.

The analysis sharing part may transmit information on the analysis and the additional analysis to the terminals of the first and second users authorized to share the information.

The visualizer may visualize the search result distributed according to time.

The rule editor may include a variable selector which selects a variable of the data; an operator selector which selects an operator for searching for the data of the selected variable; and a limit selector which selects a limit condition representing a search limit of the selected operator.

The search rule may include a set time condition.

Another embodiment is a data processing program which is installable in a computer-readable recording medium. The data processing program includes a code which causes the computer to edit, based on input editing information, the search rule which sets the search condition for searching for the generated data in accordance with time, to search for the data in accordance with the edited search rule, to visualize the search result, and to transmit additional analysis on the analysis of the search result to terminals of a first user and a second user through the network.

The data processing program may further include a code which causes the computer to search for the data by means of a predetermined search rule.

The data processing program may further include a code corresponding to a code editor which codes a new search rule and a compiler which compiles the coded search rule.

Information on the analysis and the additional analysis may be transmitted to the terminals of the first and second users authorized to share the information.

The search result distributed according to time may be visualized.

The data processing program may include a code corresponding to a variable selector which selects a variable of the data, an operator selector which selects an operator for searching for the data of the selected variable, and a limit selector which selects a limit condition representing a search limit of the selected operator.

The search rule may include a set time condition.

Further another embodiment is a computer-readable recording medium which records a program to edit, based on input editing information, the search rule which sets the search condition for searching for the generated data in accordance with time, to search for the data in accordance with the edited search rule, to visualize the search result, and to transmit additional analysis on the analysis of the search result to terminals of a first user and a second user through the network.

BRIEF DESCRIPTION OF THE DRAWINGS

FIG. 2 shows an example of data generated according to time;

FIG. 3 shows an operation of a rule editor;

DETAILED DESCRIPTION

Hereafter, an embodiment of the present invention will be described in detail with reference to the accompanying drawings. It can be easily understood by those skilled in the art that the accompanying drawings are provided only for more easily describing the present invention and the spirit and scope of the present invention is not limited to those of the accompanying drawings.

Terms used in the present specification are provided for description of only specific embodiments of the present invention, and not intended to be limiting. An expression of a singular form includes the expression of plural form thereof unless otherwise explicitly mentioned in the context.

In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics, numbers, steps, operations, components, parts or any combination thereof.

Figure 1:
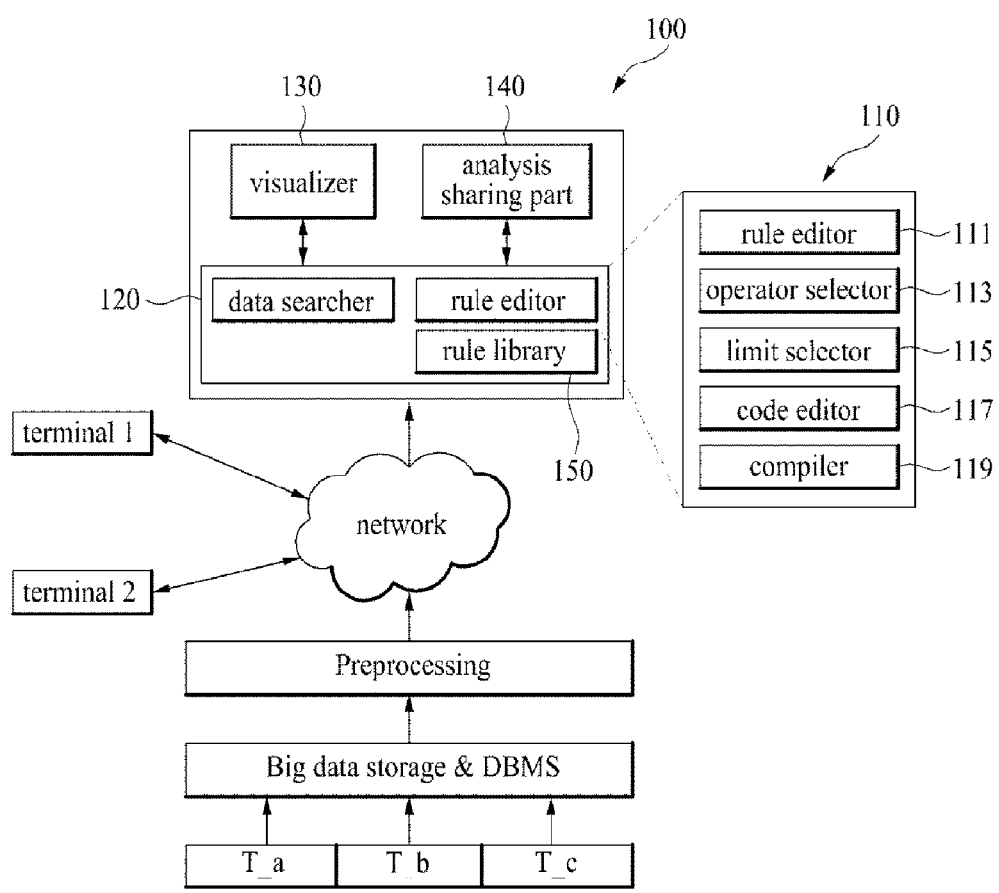
FIG. 1 shows a data processing apparatus according to an embodiment of the present invention.

FIG. 1 shows a data processing apparatus according to an embodiment of the present invention. A data processing apparatus 100 according to the embodiment of the present invention can be connected to a network. The network may be the Internet and is not limited to this. The data processing apparatus 100 may be connected to various networks, for example, intranet or a mobile communication network such as 3G or 4G, etc.

As shown in FIG. 1, the data processing apparatus according to the embodiment of the present invention includes a rule editor 110, a data searcher 120, a visualizer 130, and an analysis sharing part 140.

Based on input editing information, the rule editor 110 edits a search rule for setting a search condition for searching for data generated according to time.

The data searcher 120 searches for the data in accordance with the edited search rule.

The visualizer 130 visualizes the search result.

The analysis sharing part 140 transmits additional analysis on the analysis of the search result to terminals of a first user and a second user through the network.

In FIG. 1, a terminal 1 and a terminal 2 may correspond to the terminals of the first and second users respectively.

In FIG. 1, Big data storage & DBMS stores the data of variables T_a, T-b, and T_c.

In FIG. 1, Preprocessing may be a process of converting the data in a data format which can be processed by the data processing apparatus 100. The data processing apparatus 100 according to the embodiment of the present invention may receive from the outside the data converted in a data format shown in FIG. 2.

The rule editor 110 of the data processing apparatus 100 according to the embodiment of the present invention will be described with reference to the drawings.

FIG. 2 shows an example of data generated according to time. As shown in FIG. 2, data may be multiple numerical values to which time tags have been attached. Data #1, Data #2, and Data #3 may be data titles.

The data title may represent a temperature or humidity sensor, a pulse or blood pressure sensor, or a GPS sensor. However, the data title is not limited to this. The data title may be an apparatus which generates time-based data.

The rule editor 110 edits the rule in accordance with the search condition selected through the user's terminal, so that the user can obtain his/her desired information from the data.

As shown in FIG. 1, the rule editor 110 may include a variable selector 111 which selects the data variables T_a, T_b, and T_c, an operator selector 113 which selects an operator for searching for the data of the selected variable, and a limit selector 115 which selects a limit condition representing a search limit of the selected operator.

Here, FIG. 3 shows an example of a rule editing window representing the operation of the rule editor 110. As shown in FIG. 3, the variable selector 111 may select the data variable T_a, T_b, and T_c corresponding to the user's selection through the terminal, and may drag and drop the data variable to the rule editing window.

The operator selector 113 may select an operator corresponding to the user's selection through the terminal and drag and drop the operator to the rule editing window. As shown in FIG. 3, the operator may include a sign of inequality ($<$, $>$), a sign of equality ($=$), parenthesis, addition and subtraction signs ($+$, $-$), a maximum value (max), and a minimum value (min), etc. However, the operator is not limited to this. The limit selector 115 may select a limit condition corresponding to the user's selection through the terminal and drag and drop the limit condition to the rule editing window. The limit condition may be a numeral.

The rule editor 110 may be made by R package or a program such as Python program.

Next, various examples of the search rule will be described.

$T\_a=20$ may be a search rule which shows a specific data value at a specific timing.

A search rule for searching a range in which the specific data value is included at a specific timing may be provided. For example, $23<=T\_a<35$ may mean that it is possible to search for the data value of T_a which is greater than or equal to 23 and less than and not equal to 35 at a specific timing.

A search rule for searching for the maintenance of the value among the data values may be provided. For example, a search rule, $T\_a==4$ {30 s, 5 s} may mean that it is possible to search for T_a which is maintained to have 4 for 30 seconds. Here, 5 s is an error, and thus, T_a which is substantially maintained to have 4 for 25 to 35 seconds may be searched.

A search rule, $T\_b<15$ {55, 7 s} may mean that it is possible to search for T_b which is maintained to have a value less than and not equal to 15 for 55 seconds. Here, 7 s is an error, and thus, T_b which is substantially maintained to have a value less than and not equal to 15 for 23 to 37 seconds may be searched.

A search rule for data value delay between mutually different variables may be provided. For example, $T\_a==20 \rightarrow (20\ s,\ 5\ s) \rightarrow T\_b==40$ may mean that after T_a shows a value of 20 for 20 seconds, T_b shows a value of 40. Here, 5 s is an error, and thus, after T_a substantially shows a value of 20 for 15 to 25 seconds, T_b may show a value of 40.

A search rule, $T\_a==20 \rightarrow (40\ s,\ 3\ s) \rightarrow T\_a==20$ may mean that even after T_a shows a value of 20 for 40 seconds, T_a showing a value of 20 may be searched. Here, 3 s is an error, and thus, after T_a substantially shows a value of 20 for 37 to 43 seconds, T_a showing a value of 20 may be searched.

A search rule for searching for the variable data showing periodically a value may be provided. For example, a search rule, $T\_b==45$ [60 s, 5 s] may mean that T_b shows a value of 45 at a 60 second interval. Here, 5 s is an error, and thus, T_b showing a value of 45 at a 55 to 65 second interval may be searched.

Besides, various search rules may be edited by the rule editor 110.

As such, since the search rule may be edited by the rule editor 110, the user can edit his/her necessary search rule and search for the data.

Meanwhile, the data processing apparatus 100 according to the embodiment of the present invention may further include a rule library 150 comprised of a predetermined search rule. The rule library 150 may include a predetermined search rule, for example, clustering, classification, correlation analysis, and causality analysis.

Figure 4:
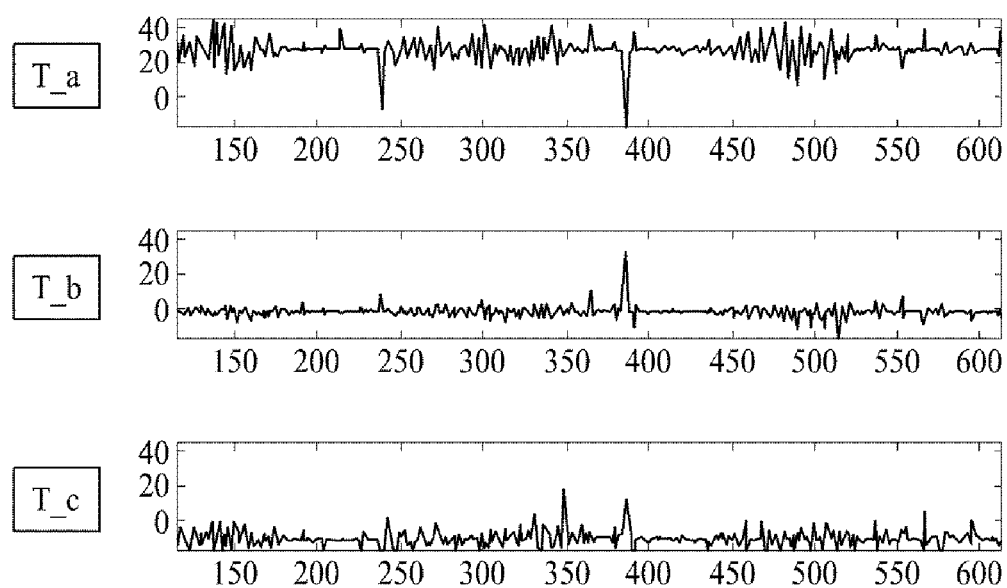
FIG. 4 shows data change of a variable in accordance with time variable.

As described above, through the edited search rule or the predetermined search rule, the data searcher 120 may search data generated, as shown in FIG. 4, according to time. Here, the data searcher 120 may process data which is input in real time or process data stored in a storage like a database (not shown).

Meanwhile, as shown in FIG. 1, the rule editor 110 may include a code editor 117 and a compiler 119. The code editor 117 can code a new search rule. The compiler 119 compiles the coded search rule.

As a result, users can program and use their desired search rules. For example, while the editing of the rule includes a process of selecting the operator, the coding of the search rule includes the programming of the user's desired operator instead of the operator selection.

Figure 5:
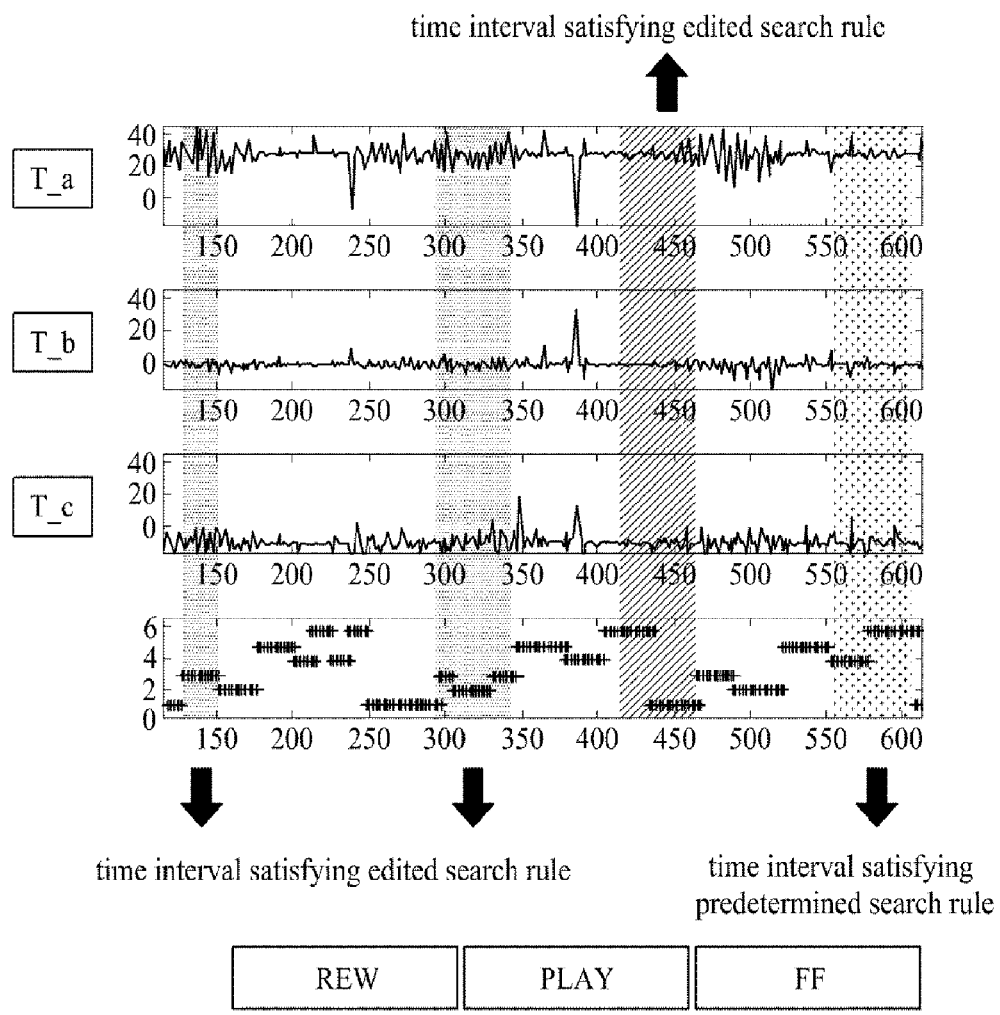
FIG. 5 shows an example of a search result visualized by a visualizer.

As shown in FIG. 5, the visualizer 130 may visualize the search result from the data searcher 120. For example, the visualizer 130 may display a time interval satisfying the search rule. Since the edited search rules may be different according to the user in search of the same data, the search result may be also varied. Also, since the predetermined search rule and the edited search rule may be different from each other, the search results through the predetermined search rule and the edited search rule may be different from each other.

Here, the visualizer 130 can control a rate at which the search result is displayed. That is, the visualizer 130 may operate in a PLAY mode in which the search result is displayed at a normal rate with the flow of time, or in a FF mode in which the search result is displayed at a rate higher than the normal rate with the flow of time, or in a REW mode in which the search result is displayed at a rate higher than the normal rate reversely to the flow of time.

The mode may be selected through a terminal connected to the network. The terminal may display the search result in each mode. Therefore, the user can observe the search result in accordance with the flow of time or rapidly observe the search data forward or backward, if necessary.

Figure 6:
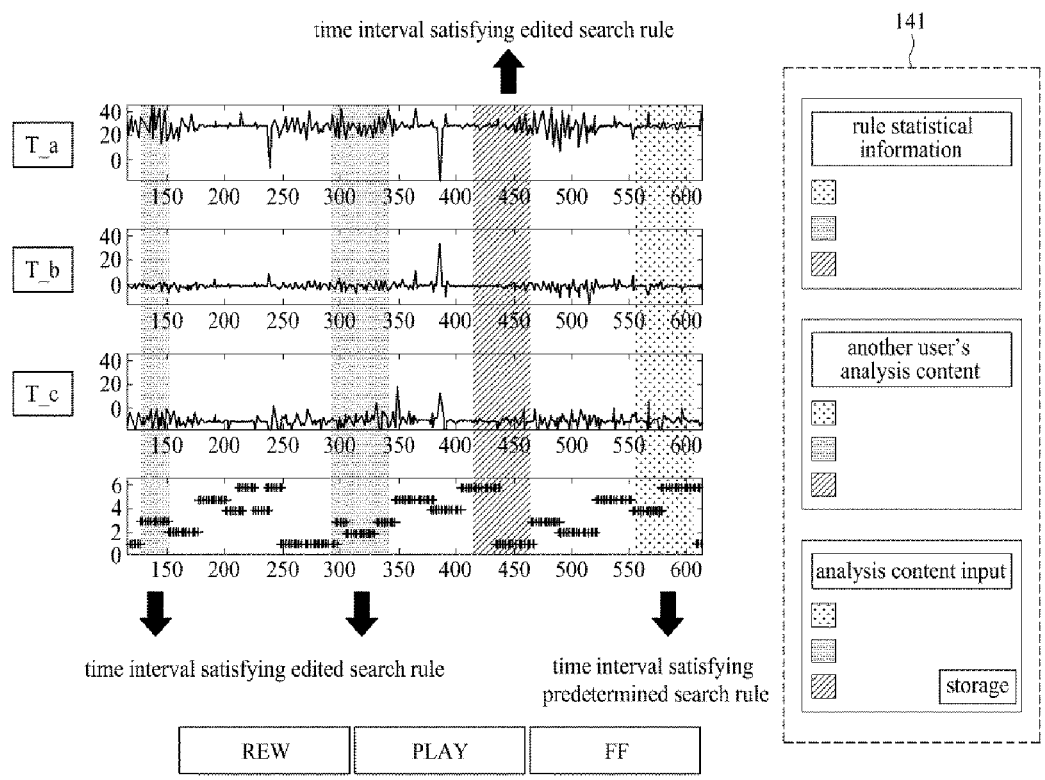
FIG. 6 shows an example of information sharing.

Meanwhile, the analysis sharing part 140 of FIG. 1 transmits additional analysis on the analysis of the search result to the first user's terminal and the second user's terminal through the network. For example, as shown in FIG. 6, the analysis sharing part 140 may include a bulletin module 141.

The bulletin module 141 may input, display and store the statistical information on the search result, input, display and store the first user's analysis on the search result, and input, display and store another user's, i.e., the second user's additional analysis on the search result.

As such, since the second user's additional analysis on the first user's analysis may be provided, the analysis on the search result can be variously performed, and the first user can make a reference to the second user's analysis which has not been considered in advance by the first user.

For example, when there is a data for the temperature and humidity which are generated from a plant and the second user has an expertise in the plant management, the first user can obtain an additional expert analysis on his/her own analysis.

Here, the additional analysis may have a simple form, for example, the number of recommendations for the first user's analysis, the number of inquiries about the first user's analysis, or may have a technical and complex form, for example, a separate analysis, etc.

Meanwhile, the analysis sharing part 140 may transmit the information on the analysis and the additional analysis to the terminals of the first and second users authorized to share the information. For example, the analysis sharing part 140 can check whether or not the first and second users are able to share the analysis information by searching the registration information of the first and second users.

When the first and second users are allowed to share the information, the bulletin module 141 may allow the analysis information input from the first user's terminal to be displayed through the second user's terminal.

As such, because it may be difficult to disclose the data to any individual or company, it is checked whether the sharing information is authorized or not. For example, when the data relates to personal biometric information or company's secret project, the data may be disclosed only to the user authorized to share the analysis information.

Meanwhile, the visualizer 130 can visualize the search result distributed according to time. As described above, since the data has been generated according to time, the search result may be also distributed according to time. As a result, the search result may have a time-dependent pattern, and the first and second users can analyze the time-dependent pattern. The analysis sharing part 140 may receive, display and store analysis and additional analysis on the time-dependent pattern from the terminals of the first and second users.

As such, since the data is searched according to time, the search rule may include a set time condition. For example, the above-described search rules, $T\_a==4$ {30 s, 5 s}, $T\_b<15$ {55 s, 7 s}, $T\_a==20\rightarrow(20$ s, 5 s$)\rightarrow T\_b==40$, and the like have a time condition so as to search for the time-dependent data.

The rule editor 110, the data searcher 120, the visualizer 130, the analysis sharing part 140, and the rule library 150 of the data processing apparatus 100 according to the embodiment of the present invention may be a data processing program. As a result, the rule editor 110, the data searcher 120, the visualizer 130, the analysis sharing part 140, and the rule library 150 may be distributed and sold on-line as a data processing program product. Otherwise, the data processing program product may be stored in a recording medium 705 such as a CD, a DVD, an USB, etc., and distributed and sold off-line.

Figure 7:
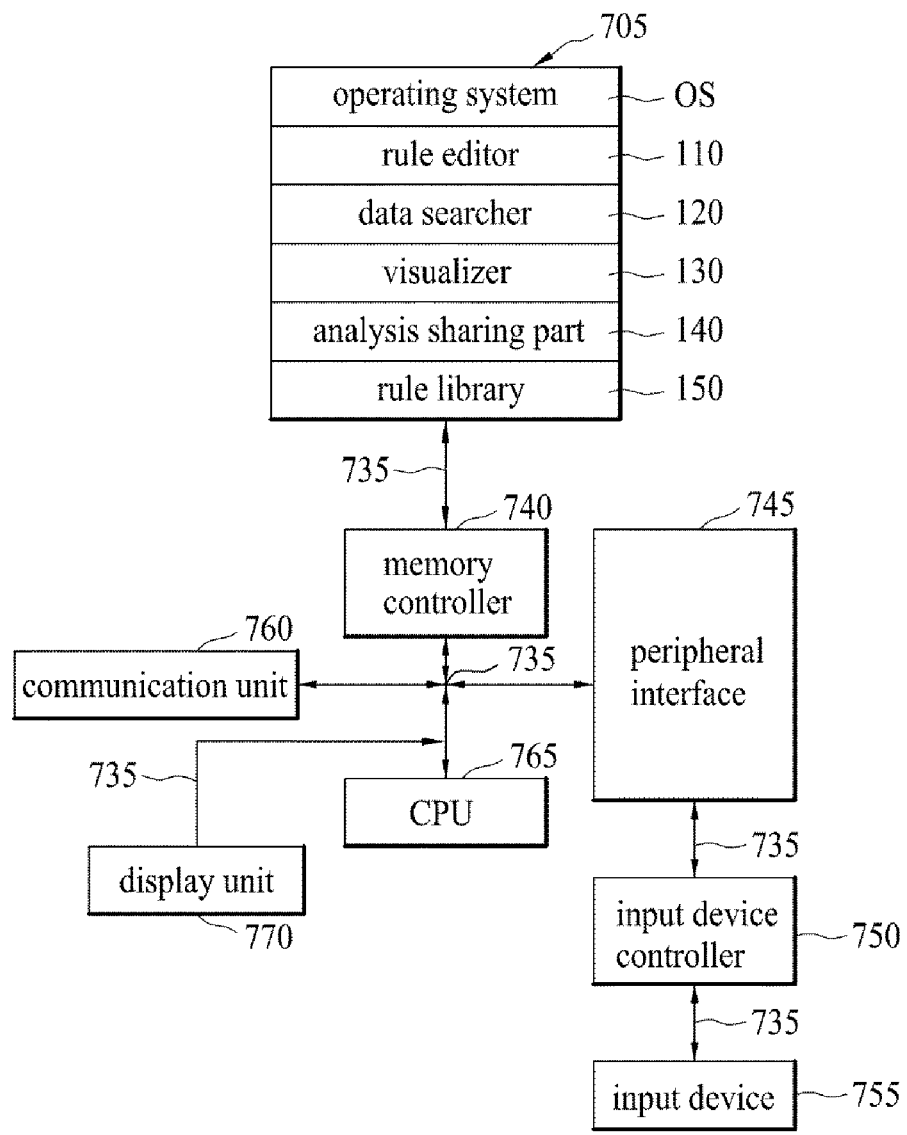
FIG. 7 shows an implementation example of the data processing apparatus according to the embodiment of the present invention.

FIG. 7 shows an implementation example of the data processing apparatus according to the embodiment of the present invention. The implementation example may correspond to a data processing apparatus in which the data processing program has been installed.

In other words, the data processing program can be installed in a computer-readable recording medium and may include a code which causes the computer to edit, based on input editing information, the search rule which sets the search condition for searching for the generated data in accordance with time, to search for the data in accordance with the edited search rule, to visualize the search result, and to transmit additional analysis on the analysis of the search result to terminals of a first user and a second user through the network.

The data processing apparatus 100 may be implemented by the computer shown in FIG. 7. Here, the computer may correspond to various apparatus, for example, a mobile phone with computer features (smartphone), a laptop computer, PC, a tablet PC, and a server. However, the computer is not limited to this.

The components of the data processing apparatus 100 can communicate with each other through at least one communication bus or at least one signal line 735. The data processing apparatus 100 may include components more or less than those shown in FIG. 7. The data processing apparatus 100 shown in FIG. 7 may be implemented with hardware, software or a combination thereof.

The recording medium 705 stores software components. The software component may include an operating system (OS), the rule editor 110, the data searcher 120, the visualizer 130, and the analysis sharing part 140, and may further include the rule library 150.

The recording medium 705 may be a CD, a DVD, an USB, a hard disk, a RAM, a flash memory or a remote storage which can be connected through a network.

Since the operating system (OS), the rule editor 110, the data searcher 120, the visualizer 130, the analysis sharing part 140, and the rule library 150 have been described in the foregoing, detailed descriptions thereof will be omitted.

The operating system may include a variety of software components and drivers in order to control a general system task. Also, the operating system may convert the data in the form of a packet for the purpose of transmitting the search result, the visualized data for the search result, the analysis and additional analysis through the network.

The operating system may be Linux, Unix, windows-based server OS, iOS, Android OS, windows-based OS for PC. However, the operating system is not limited to this.

A processor 765 is performed by loading the software component such as the operating system, the rule editor 110, the data searcher 120, the visualizer 130, the analysis sharing part 140, and the rule library 150.

A memory controller 740 can control the connection of other components such as the processor 765 and a peripheral interface 745 to the recording medium 705.

A communication unit 760 may include a communication module in order to communicate with the first and second terminals.

The peripheral interface 745 can connect an input device 755 such as a mouse, a keyboard or a touch screen to the processor 765 and memory.

An input device controller 750 receives an electrical signal from the input device 755 and converts the electrical signal in conformity with the standard of the communication bus or the signal line 750.

A display unit 770 can display the data flow, the visualized search result, and the analysis and additional analysis, etc. Since the display operation by the display unit 770 has been already described in detail through the drawings, the description thereof will be omitted.

Until now, the embodiment of the present invention has been and described. It can be understood by those skilled in the art that the embodiments can be variously modified without departing from the spirit and scope of the present invention. Therefore, the embodiment should not be limited to a particular mode and should be construed as an example. Accordingly, the present invention is not limited to the above-description and is changeable within the scope of the appended claims as well as all equivalents thereto.

What is claimed is:

1. A data processing apparatus which is connectable to a network, the data processing apparatus comprising:
    a processor;
    a display unit that is coupled to the processor;
    a memory configured to store multiple applications that includes instructions which, when executed by the processor, cause the processor to perform operations for processing numerical data and sending information through the network, the multiple applications includes:
    a rule editor which edits, based on input editing information, a search rule for setting a search condition for searching for the numerical data;
    a data searcher which searches for the numerical data in accordance with the edited search rule;
    a visualizer which visualizes a search result based on the numerical data on the display unit; and
    an analysis sharing part which transmits individual interpretations of a first user and a second user on the search result to terminals of the first user and the second user through the network so that the first user and the second user share the individual interpretations with each other,
    wherein the search rule includes a specific data value at a specific timing, a fixed timing range in which the specific data value is maintained and an error value for adding or subtracting time in the fixed timing range to correct error of the specific data value.

2. The data processing apparatus of claim 1, wherein the multiple applications further include a rule library comprised of a predetermined search rule.

3. The data processing apparatus of claim 2, wherein the rule editor comprises a code editor which codes a new search rule and a compiler which compiles the coded search rule.

4. The data processing apparatus of claim 1, wherein the visualizer visualizes the search result based on the numerical data distributed according to time.

5. The data processing apparatus of claim 1, wherein the rule editor comprises:
    a variable selector which selects a variable of the numerical data;
    an operator selector which selects an operator for searching for the numerical data of the selected variable; and
    a limit selector which selects a limit condition representing a search limit of the selected operator.

6. The data processing apparatus of claim 1, wherein the search rule comprises a set time condition.

7. A non-transitory computer-readable recording medium which records a program to edit, based on input editing information, the search rule which sets the search condition for searching for numerical data, to search for the numerical data in accordance with the edited search rule, to visualize a search result based on the numerical data, and to transmit individual interpretations of a first user and a second user on the search result to terminals of the first user and the second user through the network so that the first user and the second user share the individual interpretations with each other,
    wherein the search rule includes a specific data value at a specific timing, a fixed timing range in which the specific data value is maintained and an error value for adding or subtracting time in the fixed timing range to correct error of the specific data value.

8. A data processing apparatus coupled to a network, comprising:
    a processor;
    a display unit coupled to the processor; and
    a memory configured to store one or more applications that include instructions which, when executed by the processor, cause the processor to perform operations for processing numerical data, including the steps of:
    editing, based on input editing information, a search rule that sets a search condition for searching for the numerical data and includes a specific data value at a specific point in time, a fixed time interval during which the specific data value is maintained and an error bound to be added to and subtracted from the fixed time interval to define upper and lower limits of the fixed time interval;

searching for the numerical data in accordance with the edited search rule to generate a search result;

visualizing the search result based on the numerical data on the display unit; and transmitting individual interpretations of a first user and a second user on the search result to terminals of a first user and a second user through the network so that the first user and the second user share the individual interpretations with each other.

9. The data processing apparatus of claim 8, further comprising: storing a rule library that comprises a predetermined search rule.

10. The data processing apparatus of claim 8, further comprising: coding the search rule; and compiling the coded search rule.

11. The data processing apparatus of claim 10, wherein the step of coding the search rule comprises:

selecting a variable of the numerical data;

selecting an operator for searching for the numerical data of the selected variable; and selecting a limit condition representing a search limit of the selected operator.

* * * * *